Aug. 23, 1966 K. ROTHLISBERGER 3,268,141

REVERSIBLE TAPE FEED MECHANISM

Filed June 11, 1964 2 Sheets-Sheet 1

INVENTOR
KURT ROTHLISBERGER

BY R. C. Terry

ATTORNEY

United States Patent Office 3,268,141

Patented August 23, 1966

3,268,141

REVERSIBLE TAPE FEED MECHANISM

Kurt Rothlisberger, Chicago, Ill., assignor to Teletype Corporation, Skokie, Ill., a corporation of Delaware Filed June 11, 1964, Ser. No. 374,460
6 Claims. (Cl. 226—50)

This invention relates to web feeding devices and more particularly to a bi-directional device for feeding perforated tape at high speeds.

In the high speed punching or sensing of paper tape, the tape is moved intermittently in fixed increments and most high-speed intermittent feeding devices are unidirectional. Therefore, it is an object of the present invention to move perforated tape in either direction at high speed by engaging the tape with one or the other of two tape-feeding devices operable to feed the tape in opposite directions.

It is also an object of the present invention to move perforated tape in either direction at high speed, with intermittent motion in at least one direction.

In accordance with the preferred embodiment of the present invention for use in the tape perforator, such, for example, as the one disclosed in the patent to W. J. Zenner No. 3,056,546, granted on October 2, 1962, two unidirectionally-driven sprocket feed wheels are arranged to feed perforated tape in opposite directions, depending upon which feed wheel is in engagement with the tape. A movable tape guiding chute is provided which, in its normal position, holds the perforated tape in engagement with one of the sprocket wheels which advances the tape with a stepwise motion in one direction. Upon movement of the tape guide to its other position, the tape is engaged with the second sprocket wheel and disengaged from the first sprocket wheel. The second sprocket wheel is so positioned along the tape path with respect to the first sprocket wheel as to permit the tape to become disengaged from one sprocket wheel and engaged with the second sprocket wheel without having to move longitudinally in the tape guide. The second sprocket wheel is operable to move the tape in the opposite direction when engaged with the tape.

In the drawings, wherein like reference numerals designate the same parts throughout the several views.

Figure 1:
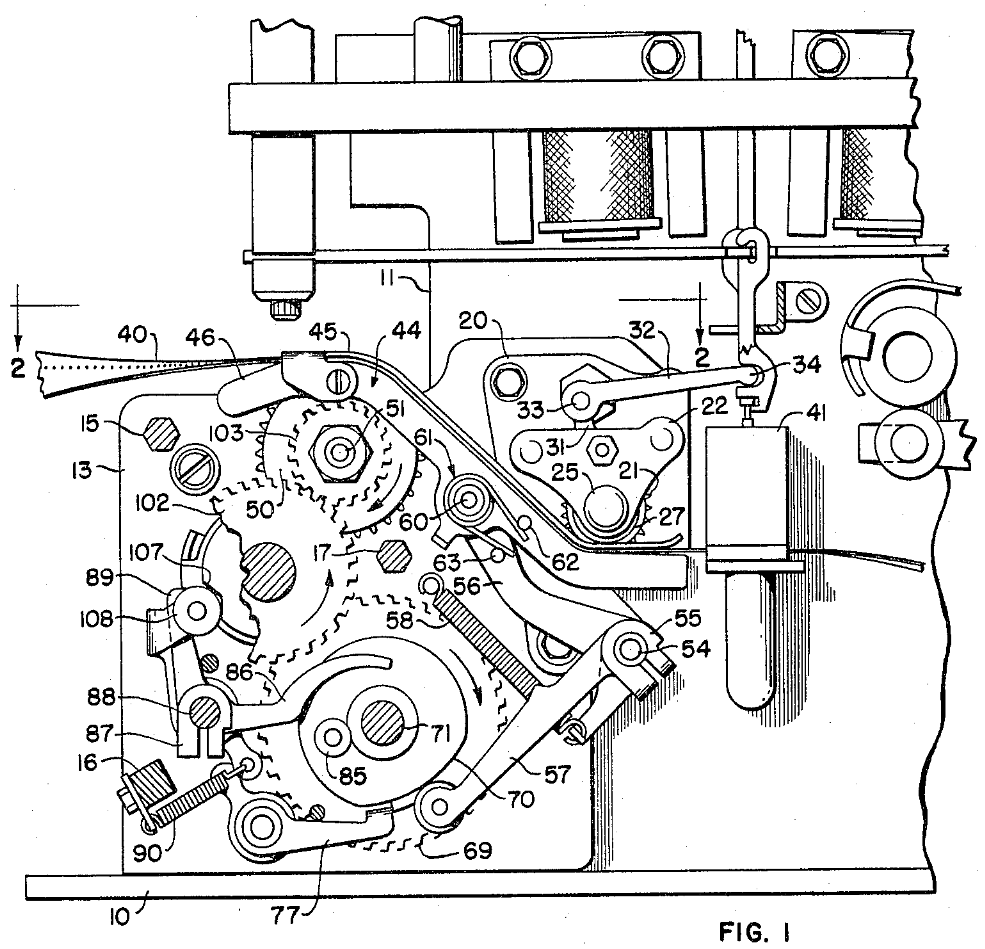
FIG. 1 shows a front view of the preferred embodiment of the invention as applied to the tape perforator shown in the Zenner patent.
Figure 2:
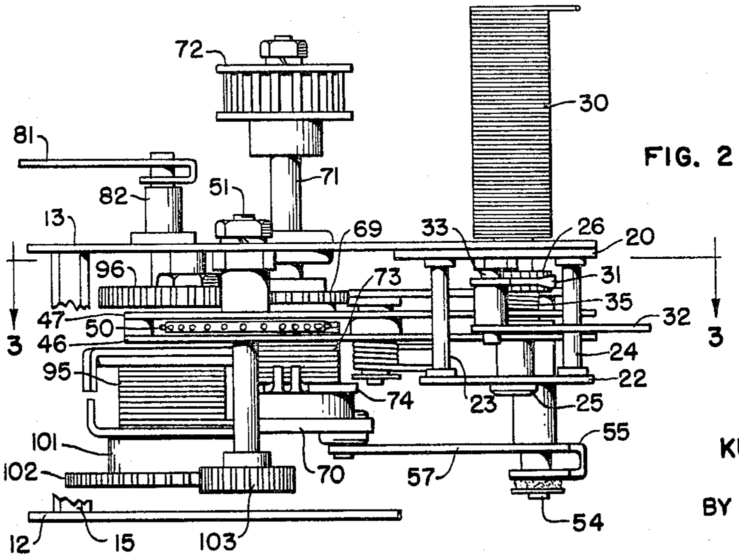
FIG. 2 is a top view of the preferred embodiment as viewed downwardly along line 2—2 in FIG. 1, but with the tape and the top of the tape guide removed for clarity.
Figure 3:
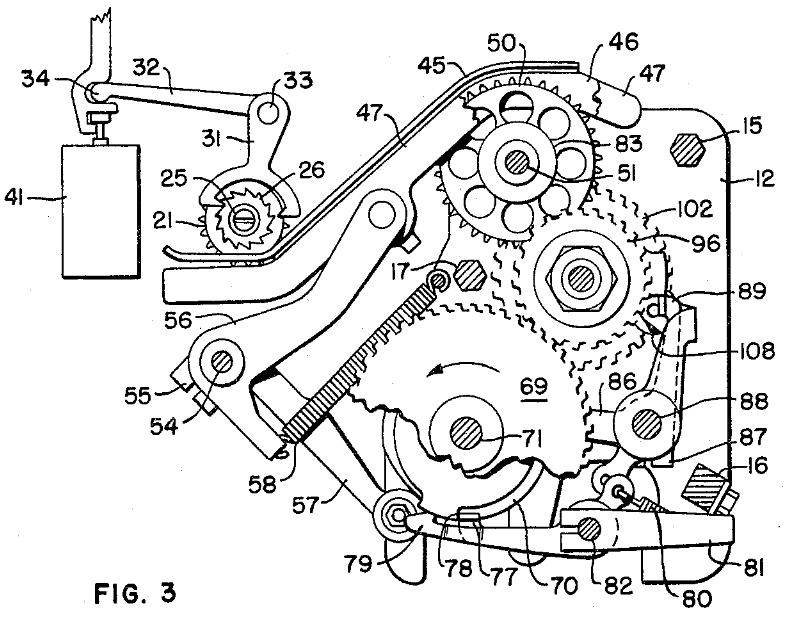
FIG. 3 is a rear view of the reversable tape feeding mechanism taken along section 3—3 in FIG. 2.

Referring now to the drawings, particular reference being had to FIGS. 1, 2, and 3 there is shown a framework consisting of a base plate 10 and a vertically extending main support member 11, these being the same as the correspondingly numbered elements of the Zenner Patent No. 3,056,546. A subassembly plate 13 has its lower edge resting on base 10 and is secured to main support member 11. Spaced from the subassembly plate 13 and parallel thereto is a front plate 12 which is rigidly supported by upper post 15, lower post 16, and center post 17. Mounted on the subassembly plate 13 is a tape feed wheel supporting structure comprising an auxiliary plate 20 in surface engagement with subassembly plate 13 and an auxiliary front plate 22 spaced away from the auxiliary plate 20 by rigid posts 23 and 24. Extending from the auxiliary front plate 22 toward the subassembly plate 13 is a feed wheel shaft 25 on which there are mounted a sprocket wheel 21, a ratchet wheel 26, and a stop 27. The ratchet wheel 26 is urged in the clockwise direction as viewed in FIG. 1 by a coil spring 30 (FIG. 2) which stores energy to be delivered to the ratchet wheel and feed wheel in the same manner as coil spring 156 of the Zenner Patent No. 3,056,546. An escapement pallet 31, which is rigidly fixed to a lever arm 32, is rotatably mounted on adjustable pivot 33. As the end 34 of lever arm 32 moves vertically, pallet 31 permits the ratchet wheel 26 to advance one step. A very stiff coiled spring 35 connects ratchet wheel 26 with sprocket wheel 21 such that the movement of the ratchet wheel through two steps, a complete cycle of lever arm 32, advances the sprocket wheel 21 through an angular increment equal to the angle between two adjacent sprocket teeth or feed pins. This normal tape sprocket wheel mechanism is substantially equivalent to that shown in the Zenner Patent No. 3,056,546 and advances the perforated tape 40 to the left as shown in FIG. 1 after the perforated tape issues from the punch block 41 (punch block 16 in the Zenner Patent No. 3,056,546) wherein the tape is perforated with information-representing code holes as well as feed holes. These holes are then engaged by the pins of sprocket wheel 21.

In the normal operation of the perforator, paper tape is punched at punch block 41, and is very accurately advanced to the left (FIG. 1) by sprocket wheel 21. The tape, however, must be guided so as to fully engage the feed pins of sprocket wheel 21, that is, to engage sprocket wheel 21 at its pitch line. The tape 40 is guided by a movable tape guide 44 which comprises an upper guide plate 45, which is slotted at its right-hand end to permit the pins of sprocket wheel 21 to extend through the plate to engage the tape, and two lower guide members 46 and 47 which extend along the tape on opposite sides of sprocket wheel 21. The tape guide 44 is pivotally supported intermediate its ends on pin 60 passing through the lower guide members 46 and 47 and mounted at the free end of arm 56 of a bell crank lever 55, the other arm of which is designated 57. Bell crank lever 55 is rockably mounted on pivot 54. The tape passes between the upper and lower guide members, which confine it in a definite path. A second sprocket wheel 50 is provided which is arranged to be driven in a clockwise direction as viewed in FIG. 1. In the normal operation of the punch, the movable tape guide 44 holds the tape in engagement with sprocket wheel 21 and out of engagement with sprocket wheel 50. To maintain the proper relationship between the tape 40 and sprocket wheel 21, the upper guide plate 45 rests against stop disc 27 mounted on shaft 25; stop disc 27 is an upper limit for the right end of tape guide 44 against stop disc 27.

Lever 55 is biased in the clockwise direction by biasing spring 58 as shown in FIG. 1, and the tape guide 44 is urged in the counterclockwise direction about pivot 60 by a torsion spring 61 which bears against a post 62 on guide member 46 and a post 63 on arm 56. The position of lever 55, and hence the position of the tape guide relative to sprockets 21 and 50, is determined by the position of arm 57 which has at its free end a roller engaging a cam 70.

Rotatably supported by subassembly plate 13 and front plate 12 is a shaft 71 which is continuously driven from a suitable power source (not shown) through sprocket wheel 72 (FIG. 2). Rigidly mounted on shaft 71 is a gear 69 and the driving member of a one-revolution spring clutch 73 similar to that shown in the copending application of N. G. Kamen, Serial No. 284,140, filed May 29, 1963, now abandoned. Cam 70 is mounted on the driven member 74 of the spring clutch 73 and rotates through one revolution each time that the spring clutch 73 is tripped. Spring clutch 73 is controlled by a stop lever 77 which is biased in the clockwise direction by a spring 80 to engage and block a lug 78 on one end of the spring in the clutch. Stop lever 77 and lug 78 correspond to blocking surface 42 and lug member 43 in the copending application of N. G. Kamen, Serial No. 284,140. A hook 79 is biased by a spring (not shown) to engage a lug (not shown) on the other end of the clutch spring in order to keep the clutch disengaged, for a minimum of clutch friction. The one-revolution clutch shown in the patent to A. N. Nilson, No. 2,566,031, granted on August 28, 1951, is also suitable for use in place of the spring clutch used herein. In addition, the clutch disclosed in the Nilson patent uses a latch 69 to hold the clutch members out of engagement when the clutch is idle, in order to reduce friction.

Clutch 73 is tripped by manually or automatically rotating arm 81 in the counterclockwise direction rotating pivot shaft 82 as shown in FIG. 3. This rotates stop lever 77 out of blocking engagement with lug 78 permitting clutch 73 to couple cam 70 to rotating shaft 71.

When cam 70 begins rotating in a clockwise direction as viewed in FIG. 1, it moves follower arm 57 and forces lever 55 to rotate counterclockwise around its pivot 54 against the bias of its spring 58. Rotation of lever 55 in the counterclockwise direction moves pivot 60 downwardly and to the left as shown in FIG. 1. Due to the counterclockwise bias applied by spring 61 to tape guide 44, upper guide plate 45 initially remains in contact with stop 27 even though pivot 60 is moving downwardly. This causes the tape guide 44 to rotate about its point of contact with stop 27 until the tape within the tape guide engages the feed pins of sprocket wheel 50. When feed pins of sprocket wheel 50 are sufficiently engaged with the tape, the bottom surface of lower guide member 47 (FIG. 3) engages a stop disc 83 mounted on shaft 51. At this point the tape is simultaneously in full engagement with both of the sprocket wheels 21 and 50; therefore, the shaft 51 of sprocket wheel 50 must be so spaced from the shaft 25 of sprocket wheel 21 that the feed pins of sprocket wheels 21 and 50 are an integral number of feed hole increments apart along the path of the tape 40 in the tape guide 44. Continued rotation of the cam 70 further rotates lever 55 about its pivot 54 and further moves pivot 60 downwardly and to the left as shown in FIG. 1 causing the tape guide 44 to pivot clockwise about stop 83, thus disengaging the tape 40 from the sprocket wheel 21. Cam 70 then begins a long period of dwell.

At this point in the rotation of cam 70, a projection 85 (FIG. 1) on cam 70 engages an arm 86 of bell crank 87 which is mounted on a pivot 88, rotating bell crank 87 in a counterclockwise direction and moving stop arm 89 of bell crank 87 to the left against the bias of a spring 90. Stop arm 89 controls a second one-revolution spring clutch 95 (FIG. 2) which is substantially the same as spring clutch 73. The driving member of clutch 95 is driven by a gear 96 (FIG. 3) which is in turn driven by gear 69 which rotates with shaft 71. The driven member 101 of clutch 95 drives gear 102 which rotates sprocket wheel 50 through gear 103. Thus, when spring clutch 95 is tripped, it drives gear 102 through one revolution driving sprocket wheel 50 which moves the tape 40 to the right through the tape guide 44 and punch block 41 for a distance determined by the size of sprocket wheel 50 and the ratio of gears 102 and 103. A detent notch 107 is provided in driven member 101 to coact with a detent roller 108 which is spring-urged (not shown) to assure that at the end of each revolution of clutch 95, the driven member 101 and sprocket wheel 50 always stop with the feed holes in the tape 40 aligned with the feed pins of sprocket wheel 21.

By the time that the driven member 101 has completed its single revolution, cam 70 has completed the dwell portion of its cycle and lever 55 rotates clockwise about its pivot 54 under the urging of its biasing spring 58 causing the tape 40 to engage with sprocket wheel 21 then to disengage from sprocket wheel 50.

Figure 4:
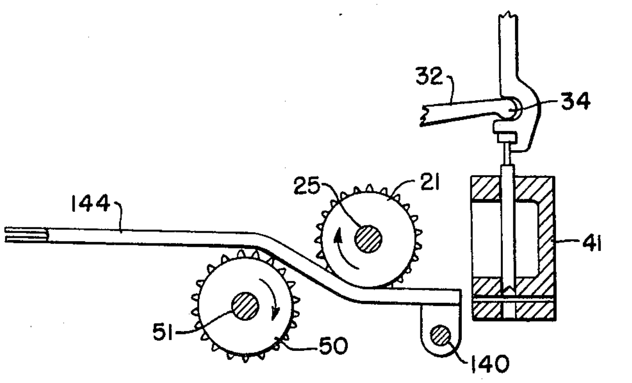
FIG. 4 is a schematic diagram of an alternate arrangement showing the basic elements of the invention.

FIG. 4 shows in schematic form an alternative arrangement of a shiftable tape guide associated with the two sprocket wheels 21 and 50. The tape guide 144 is pivoted at 140, and in its normal position it holds the tape in engagement with sprocket wheel 21. When tape reversal is desired, sprocket wheel 21 is stopped and the tape guide is rotated counterclockwise about pivot 140, engaging the tape with sprocket wheel 50 and disengaging the tape from sprocket wheel 21. Sprocket wheel 50 is then rotated clockwise, returning the tape through the tape guide 144 and punch block 41.

Although a single embodiment of the invention is shown in the drawings and described in the foregoing specification, it will be understood that the invention is not limited to the specific embodiment described, but is capable of modification and rearrangement and substitution of parts and elements without departing from the spirit of the invention.

What is claimed is:

1. In a tape drive for moving in either of two directions a tape having uniformly spaced feed holes;
- a first sprocket wheel having at least one sprocket pin and which rotates to move tape in one direction;
- a second sprocket wheel which rotates to move tape in the other direction and having at least one sprocket pin spaced a whole number of feed-hole spaces from one of the sprocket pins of the first sprocket wheel in the rest position of both sprocket wheels;
- a movable tape guide;
- means, including the tape guide for engaging at least one of the tape feed holes with at least the one sprocket pin of the first wheel; and
- means, including the tape guide, for disengaging the tape from the one sprocket pin of the first wheel and engaging at least one of the tape feed holes with at least the one sprocket pin of the second wheel.

2. In a tape drive for moving in either of two directions a tape, having evenly-spaced feed holes;
- a first sprocket wheel having at least one sprocket pin and which rotates to move tape in one direction;
- a second sprocket wheel which rotates to move tape in the other direction and having a sprocket pin spaced a whole number of feed-hole spaces from the sprocket pin of the first sprocket wheel in the rest position of the first wheel;
- means for engaging one of the tape feed holes with the one sprocket pin of the first wheel; and
- means for disengaging the tape from the one sprocket pin of the first wheel and engaging another one of the tape feed holes with the sprocket pin of the second wheel.

3. A tape drive for moving tape in either of two directions comprising:
- a first sprocket wheel for feeding the tape in one direction;
- a second sprocket wheel for feeding the tape in the other direction; and
- a movable tape guide having two effective positions such that in one of the two positions the tape is engaged with the one sprocket wheel and in the other of the two positions the tape is engaged with the other sprocket wheel.

4. A tape drive for moving tape in either of two directions comprising:
- a first sprocket wheel which feeds the tape in a stepwise manner in one direction;
- a second sprocket wheel for feeding the tape in the other direction; and
- a movable tape guide having two effective positions, in one of which the tape is engaged with one of the sprocket wheels and in the other of the two positions the tape is engaged with the other sprocket wheel.

5. In a reversible drive for tape having feed holes therein:

two sprocket wheels with pins for engaging the feed holes in the tape, said wheels spaced a distance apart to allow the tape to be disposed in a predetermined path between the wheels and when so disposed to engage both sprocket wheels simultaneously;

two rotary feeding devices each connected to one of the sprocket wheels to rotate the sprocket wheels to feed the tape in opposite directions;

means for maintaining the tape in engagement with one sprocket wheel and out of engagement with the other sprocket wheel; and means for reversing the engagement of the tape to maintain the tape in engagement with said sprocket wheel and out of engagement with said one sprocket wheel.

6. In a reversible drive for tape having feed holes therein:

a first sprocket wheel;

a rotary stepping device for rotating the first sprocket wheel for feeding the tape in one direction;

a second sprocket wheel spaced from the first sprocket wheel;

a rotary driving device for rotating the second sprocket wheel for feeding the tape in the other direction;

means for maintaining the tape in engagement with the first sprocket wheel and out of engagement with the second sprocket wheel; and means for reversing the engagement of the tape to maintain the tape in engagement with the second sprocket wheel and out of engagement with the first sprocket wheel.

References Cited by the Examiner

UNITED STATES PATENTS

| | | | |
|---|---|---|---|
| 3,007,086 | 10/1961 | Baumeister | 226—50 X |
| 3,110,451 | 11/1963 | Moriya | 226—52 |

M. HENSON WOOD, Jr., *Primary Examiner.*

A. N. KNOWLES, *Assistant Examiner.*